J. B. BERNIER.
CAR FENDER.
APPLICATION FILED JAN. 20, 1910.

957,540.

Patented May 10, 1910.

2 SHEETS—SHEET 1.

WITNESSES:
Ludger A. Nicol.
Mary Kenyon.

INVENTOR:
Jean B. Bernier,
BY Albert M. Moores,
His ATTORNEY.

J. B. BERNIER.
CAR FENDER.
APPLICATION FILED JAN. 20, 1910.

957,540.

Patented May 10, 1910.

2 SHEETS—SHEET 2.

WITNESSES:
Ludger A. Nicol.
Mary Kenyon.

INVENTOR:
Jean B. Bernier,
BY Albert M. Moore,
His ATTORNEY.

UNITED STATES PATENT OFFICE.

JEAN B. BERNIER, OF LOWELL, MASSACHUSETTS.

CAR-FENDER.

957,540.  Specification of Letters Patent.  Patented May 10, 1910.

Application filed January 20, 1910. Serial No. 539,160.

*To all whom it may concern:*

Be it known that I, JEAN B. BERNIER, a subject of the United Kingdom of Great Britain and Ireland, residing at Lowell, in the county of Middlesex and Commonwealth of Massachusetts, have invented a certain new and useful Improvement in Car-Fenders, of which the following is a specification.

This invention relates to car-fenders and is applicable to automobiles, trolley-cars and any other land vehicles driven by motors carried by such vehicles.

The principal objects of this invention are to furnish an inexpensive and efficient means of preventing persons from falling under such vehicles; to adapt the fender to grasp and hold in safety persons of any stature; to operate on persons in advance of such vehicles upon any part of the path of the same with equal facility and safety; to facilitate moving the fender out-of the operative position when not required for use.

Figure 1:
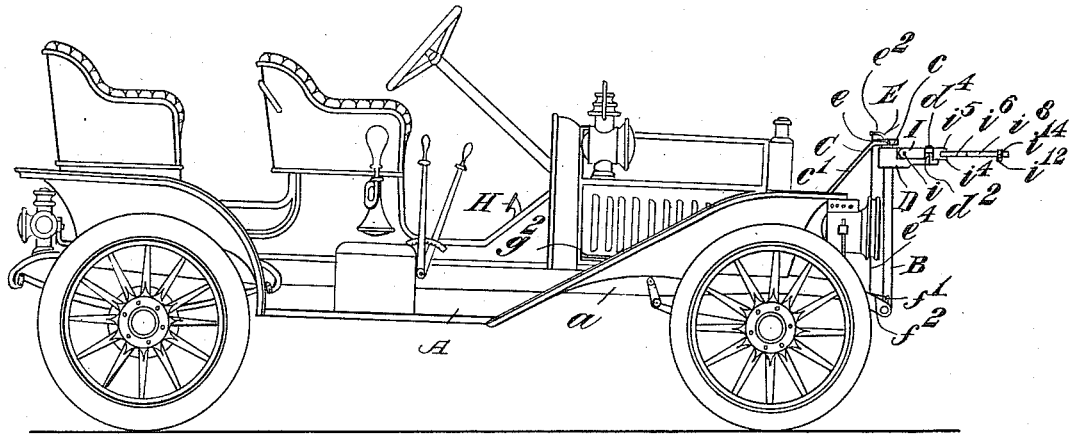
Figures 2, 4, 5:
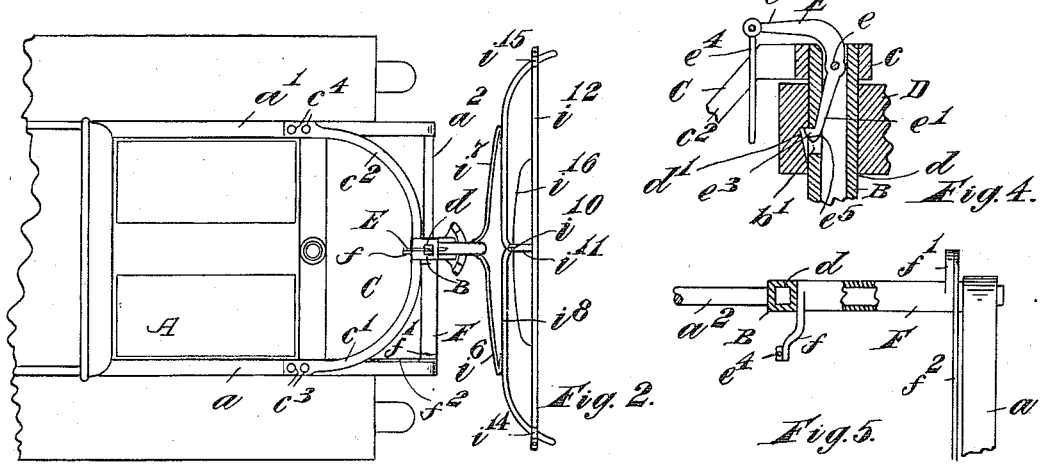
Figures 3, 6:
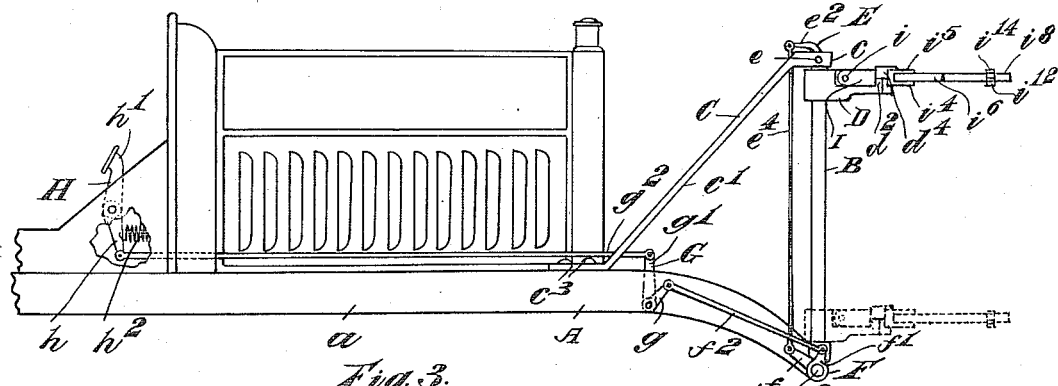
Figure 7:
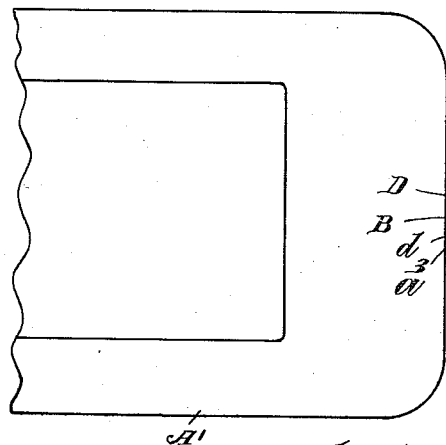
Figure 9:
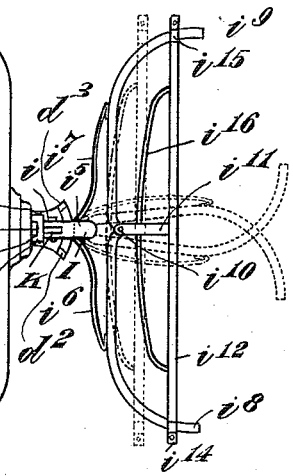
Figure 8:
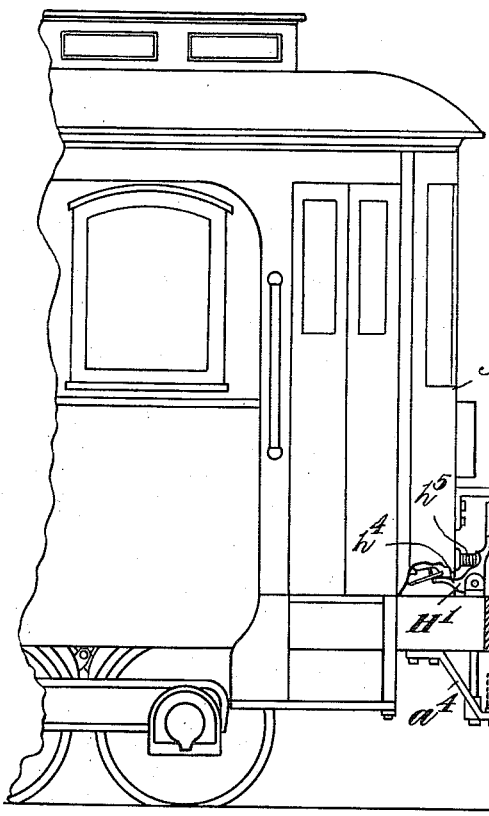
Figure 10:
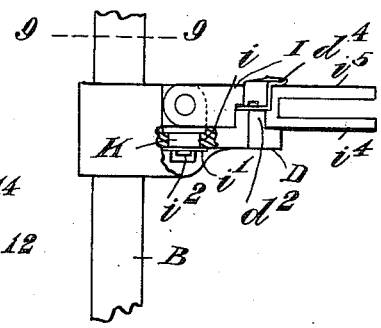

In the accompanying drawing on two sheets, Figure 1 is a side elevation of an automobile provided with my improvement; Fig. 2, a plan of the front part of the frame of said automobile showing said improvement attached thereto; Fig. 3, a side elevation of the front part of the frame and radiator with adjacent parts of said improvement attached to said frame, showing means for holding the fender at its normal height and of releasing and dropping the same; Fig. 4, a central vertical longitudinal section of a part of said holding and releasing means; Fig. 5, a plan of parts of the holding and releasing means; Fig. 6, a front elevation of a part of one of the grippers and of the supporting bar; Fig. 7, a plan of a street-car provided with said fender which is shown in full lines, open or in position for operation, and in dotted lines, closed or after operation; Fig. 8, a side elevation of said street-car and fender, the latter being shown in full lines at its normal height and in dotted lines in its lower position; Fig. 9, a horizontal section on the line 9 9 in Fig. 10 of the fender-supporting post and a plan of the stop plate with a part of the fender; Fig. 10, a side elevation of the parts shown in Fig. 9.

A, Figs. 1–3, indicates an automobile; $a$ $a^1$, the side-rails of the frame, these being of usual construction. $a^2$ designates the front cross rail or tie of said frame.

B indicates a square or many sided vertical hollow post or standard, the lower end of which is rigidly secured to the front rail $a^2$, at the middle of said rail, the upper end of said post being connected by the arms $c^1$ $c^2$ of a brace-piece C to the frame of the automobile, said arms being united in front to a collar $c$ which surrounds and fits said post and the rear ends of said arms being bolted at $c^3$ $c^4$ to the side-rails $a$ $a^1$.

A horizontal plate D is provided with a vertical perforation $d$ which receives and has a sliding fit on the post B and allows said plate to be raised up to the collar $c$ of the brace-piece, the position usually occupied by said plate, where it may be held by a bell-crank shaped catch-lever E, pivoted in the hollow post B on a pin $e$ which is represented as passing also through said collar $c$ and as retaining said collar on said post. The lower arm $e^1$ of said catch-lever E has a hook $e^3$ which reaches through a hole $b^1$ in said post B to engage a notch in the inner wall of the perforation $d$.

The upper arm $e^2$ of the lever E is nearly horizontal and is connected by a link $e^4$ to an arm $f$ which projects from a sleeve F arranged to turn freely on the front rail $a^2$ between the post B and the side-rail $a$, and another link $f^2$ connects another arm $f^1$ on said sleeve F to one arm $g$ of a bell-crank lever G, pivoted on said side-rail $a$, while the other arm $g^1$ of said lever G is connected by a link $g^2$ to the lower arm $h$ of a lever H, pivoted in the body of the automobile, so that when the upper arm $h^1$ of said lever H is pressed forward, as by the foot of the operator, the hook $e^3$ will be drawn out of the notch $d^1$ and allow the unsupported plate D to fall. When the pressure is removed from the lever H, said lever is restored to position by the expansion of the spring $h^2$ and causes the hook $e^3$ to project from the post. The under side of said hook $e^3$ is beveled at $e^5$ from its point downward so that when the plate D is again raised sufficiently, said hook is forced into the post until the notch $d^1$ is high enough to admit said hook which is again forced into engagement by the expansion of said spring $h^2$.

The shank or holder I of the fender (best seen in Figs. 9 and 10) is pivoted at $i$ to an eye-bolt K which passes loosely down through the plate D and through a washer $i^1$ and is retained in place by any usual means as by a key $i^2$ or split pin in such a manner as to allow said shank to be raised into a vertical position or to be swung laterally, the downward movement of said shank being limited by the plate D on which said shank rests when in operative position and the lateral movement of said shank being limited by upwardly-projecting stops $d^2$ $d^3$ integral with said plate. The shank is prevented from being slightly raised and swung laterally over the top of the stops, $d^2$ or $d^3$, by an inward projection $d^4$ $d^5$ on the top of each of the stops which makes the rising of the shank when in proximity to a stop, impossible.
To the shank I (Figs. 2, 9 and 10) which is transversely slotted to form upper and lower guides $i^4$ $i^5$, are secured between said guides, the rear ends of two springs $i^6$ $i^7$, the front end of which springs are attached to two grippers $i^8$ $i^9$, jointed at their inner ends, at $i^{10}$, to each other and to a forwardly projecting bar $i^{11}$.

The front end of the springs $i^6$ $i^7$ are attached to the grippers $i^8$ $i^9$ about one-half of the distance between the joint $i^{10}$ and the free ends of the same and tend to press the points of such attachment toward each other in such a manner that if the joint $i^{10}$ is in the rear of a stright line connecting said points, the free ends of said grippers will be thrown forward toward each other, but if said joint is in advance of said line, said free ends will be kept apart from each other. The end-portions of said grippers are curved forward, as shown in Fig. 2, and rest upon a transverse supporting bar $i^{12}$, the middle of which is rigidly secured to the front end of the bar $i^{11}$ at right angles therewith and is provided at its ends with stops $i^{14}$ $i^{15}$ which engage said grippers and limit the outward swing of the same, said stops being so arranged that when the grippers are in engagement with said stops the joint $i^{10}$ will be in advance of the line which connects the points where the springs $i^6$ $i^7$ are attached to the grippers and the grippers will be held open by said springs. The connection of the bars $i^{11}$ $i^{12}$ is strengthened and stiffened by a curved brace $i^{16}$ which connects said bars.
When the bar $i^{12}$ strikes and is pushed back by any obstruction, as by a person standing in the path of the vehicle, the joint $i^{10}$ is crowded back until the springs close the grippers into the position shown by dotted lines in Fig. 7, grasping and supporting the person and carrying him along with the vehicle. The supporting-bar yields readily when it strikes a person without injury to him and with the grippers may be padded or cushioned with soft material, still further to avoid any injury to person or clothing. The grippers and the supporting-bar may be made of metallic tubing and thus be very light while of sufficient strength. The swiveling of the shank upon the supporting plate allows the supporting-bar and the grippers to swing laterally to bring them into proper position to operate in the most efficient manner whether the person is in the middle of the path of the vehicle or at one side of the middle.

In Figs. 7 and 8, the invention is shown applied to a street-car A'. The only differences between what is shown in these figures and what is already described is that in these figures the post B is supported upon brackets $a^3$ $a^4$ secured to any sufficiently rigid part of the car and that the fender is held in its highest position by a bell-crank lever $H^1$, one arm $h^3$ of which reaches under the plate D and is withdrawn therefrom by the pressure of the motorman's foot upon the other arm $h^4$ of said lever, said lever being returned to operative position by a spring corresponding in function to the spring $h^5$ above described. The other parts are like those above described and indicated by like letters of reference.

I claim as my invention:—
1. The combination of a pair of springs, means for supporting the rear ends of the same at the front of a vehicle, a pair of grippers each attached between its ends to the free end of one of said springs, said grippers being jointed to each other at their rear ends and adapted to be held open or to be closed by said springs, according as the point of junction of said grippers is in front of or in the rear of a line connecting the points of attachment of said grippers to said springs, and a transverse bar arranged across said grippers and connected to said grippers at said junction and adapted when pressed backward to move said point of junction back of said line connecting said points of attachment.

2. The combination of a pair of springs, means for supporting the rear ends of the same at the front of a vehicle, a pair of grippers each attached between its ends to the free end of one of said springs, said grippers being jointed to each other at their rear ends and adapted to be held open or to be closed by said springs according as the point of junction of said grippers is in front of or in the rear of a line connecting the points of attachment of said grippers to said springs, a transverse bar arranged across said grippers, and connected to said grippers at said junction, and adapted when pressed backward to move said point of junction back of said line connecting said points of attachment, and stops carried by said transverse-bar to limit the opening of said grippers.

3. The combination of a vertical post, means for securing the same to the front end of a vehicle, a horizontal plate, vertically movable on said post, a shank carried by said plate, springs, each attached at one end to said shank, a pair of grippers, each attached between its ends to one of said springs, said grippers having their outer ends curved and their inner ends jointed to each other, and a transverse bar pivoted to said grippers at their junction and arranged under said grippers.

4. The combination of a vertical post, means for securing the same to the front end of a vehicle, a horizontal plate vertically movable on said post, a shank carried by said plate, springs each attached at one end to said shank, a pair of grippers each attached between its ends to one of said springs, said grippers having their outer ends curved and their inner ends jointed to each other, a transverse bar pivoted to said grippers at their junction and arranged under said grippers and having stops to limit the opening of said grippers.

5. The combination in a fender, of a plate, a shank pivoted thereto and normally supported thereon in a horizontal position, but adapted to be raised therefrom, a pair of springs secured to said shank, a pair of grippers each attached between its ends to the free end of one of said springs, said grippers being jointed to each other at their rear ends and adapted to be held open or to be closed by said springs, according as the point of junction of said grippers is in front or in the rear of a line connecting the points of attachment of said grippers to said springs, and a transverse bar arranged across said grippers and connected to said grippers at said junction and adapted when pressed backward to move said point of junction back of said line connecting said points of attachment.

6. The combination in a fender, of a plate, a shank swiveled thereto to have a lateral movement in either direction, stops to limit such lateral movement, a pair of springs secured to said shank, a pair of grippers, each attached between its ends to the free end of one of said springs, said grippers being jointed to each other at their rear ends and adapted to be held open or to be closed by said springs, according as the point of junction of said grippers is in front or in the rear of a line connecting the points of attachment of said grippers to said springs, and a transverse bar arranged across said grippers and connected to said grippers at said junction and adapted when pressed backward to move said point of junction back of said line connecting said points of attachment.

7. The combination in a fender, of a shank, means of supporting the same, a pair of springs secured to said shank, a pair of grippers, each attached between its ends to the free end of one of said springs, said grippers being jointed to each other at their rear ends and adapted to be held open or to be closed by said springs, according as the point of junction of said grippers is in front or in the rear of a line connecting the points of attachment of said grippers to said springs, and a transverse bar arranged across said grippers and connected to said grippers at said junction and adapted when pressed backward to move said point of junction back of said line connecting said points of attachment, said shank having a transversely-slotted free end to receive and support the jointed ends of said grippers when closed.

8. The combination of a vertical post, means of securing the same to the front end of a vehicle, a horizontal plate, movable vertically on said post, a shank carried by said plate, springs, each attached at one end to said shank, a pair of grippers, each attached between its ends to one of said springs, said grippers having their outer ends curved and their inner ends jointed to each other, a transverse bar pivoted to said grippers at their junction and arranged under said grippers, a catch-lever, adapted to engage said plate and to hold the same in a raised position, and a spring to maintain such engagement.

In witness whereof, I have affixed my signature in presence of two witnesses.

JEAN B. BERNIER.

Witnesses:
ALBERT M. MOORE,
LUDGER A. NICOL.